US007703278B2

(12) United States Patent
Kobayashi et al.

(10) Patent No.: US 7,703,278 B2
(45) Date of Patent: Apr. 27, 2010

(54) EXHAUST EMISSION CONTROL DEVICE OF INTERNAL COMBUSTION ENGINE

(75) Inventors: Kazuo Kobayashi, Nagoya (JP); Shinichiro Okugawa, Toyota (JP)

(73) Assignee: DENSO Corporation, Kariya (JP)

( * ) Notice: Subject to any disclaimer, the term of this patent is extended or adjusted under 35 U.S.C. 154(b) by 287 days.

(21) Appl. No.: 11/118,344

(22) Filed: May 2, 2005

(65) Prior Publication Data

US 2005/0247052 A1 Nov. 10, 2005

(30) Foreign Application Priority Data

May 10, 2004 (JP) ............... 2004-139915

(51) Int. Cl.
*F01N 3/00* (2006.01)
(52) U.S. Cl. ............... 60/297; 60/274; 60/286; 60/295; 60/300
(58) Field of Classification Search .......... 60/274, 60/277, 285, 286, 295, 297, 300, 311
See application file for complete search history.

(56) References Cited

U.S. PATENT DOCUMENTS

| | | | | |
|---|---|---|---|---|
| 4,772,995 A | * | 9/1988 | Gautherin et al. | 363/21.1 |
| 5,105,619 A | * | 4/1992 | Arai | 60/286 |
| 5,121,601 A | * | 6/1992 | Kammel | 60/275 |
| 5,277,025 A | * | 1/1994 | Gonze et al. | 60/274 |
| 5,489,319 A | * | 2/1996 | Tokuda et al. | 96/400 |
| 5,802,844 A | * | 9/1998 | Lee et al. | 60/274 |
| 5,822,977 A | * | 10/1998 | Fukuda et al. | 60/274 |
| 6,293,097 B1 | * | 9/2001 | Wu et al. | 60/286 |
| 6,526,746 B1 | * | 3/2003 | Wu | 60/286 |
| 6,948,311 B2 | * | 9/2005 | Schaller et al. | 60/286 |
| 7,076,944 B2 | * | 7/2006 | Okugawa et al. | 60/295 |
| 7,098,634 B1 | * | 8/2006 | Yu | 323/224 |
| 2004/0187477 A1 | | 9/2004 | Okugawa et al. | |

(Continued)

FOREIGN PATENT DOCUMENTS

DE 10 2004 024 115 A1 12/2004

(Continued)

OTHER PUBLICATIONS

Office Action mailed on Mar. 31, 2009 in corresponding JP Application No. 2004-139915 with an at least partial English-language translation thereof.

(Continued)

*Primary Examiner*—Tu M Nguyen
(74) *Attorney, Agent, or Firm*—Nixon & Vanderhye P.C.

(57) ABSTRACT

An exhaust emission control device includes a plurality of devices for removing particulates accumulated in a particulate filter. A temperature increasing device increases a temperature of the particulate filter. A temperature estimator estimates the temperature of the particulate filter. A particulate accumulation quantity estimator estimates a quantity of accumulated particulates. A temperature increase quantity controller controls a temperature increase to an output of the temperature estimator when the quantity of accumulated particulates exceeds a predetermined value. A time ratio processor computes a time ratio between performance and interruption of a temperature increasing operation. A base period processor computes a base period such that the base period varies from time to time. A switching device switches between performance and interruption of the temperature increasing operation based on the time ratio and the period that becomes the base.

22 Claims, 11 Drawing Sheets

U.S. PATENT DOCUMENTS

2004/0226288 A1 11/2004 Okugawa et al.
2006/0179821 A1* 8/2006 Zhan et al. .................. 60/286

FOREIGN PATENT DOCUMENTS

| EP | 0 758 713 A1 | 2/1997 |
| EP | 1 375 877 A2 | 1/2004 |
| FR | 2 853 006 | 10/2004 |
| JP | 11-101122 | 4/1999 |
| JP | 2001-098989 A | 4/2001 |
| JP | 2004-108344 A | 4/2004 |
| JP | 2004-132280 A | 4/2004 |

OTHER PUBLICATIONS

French Search Report dated Apr. 3, 2007 in French Application No. 05 04691.

* cited by examiner

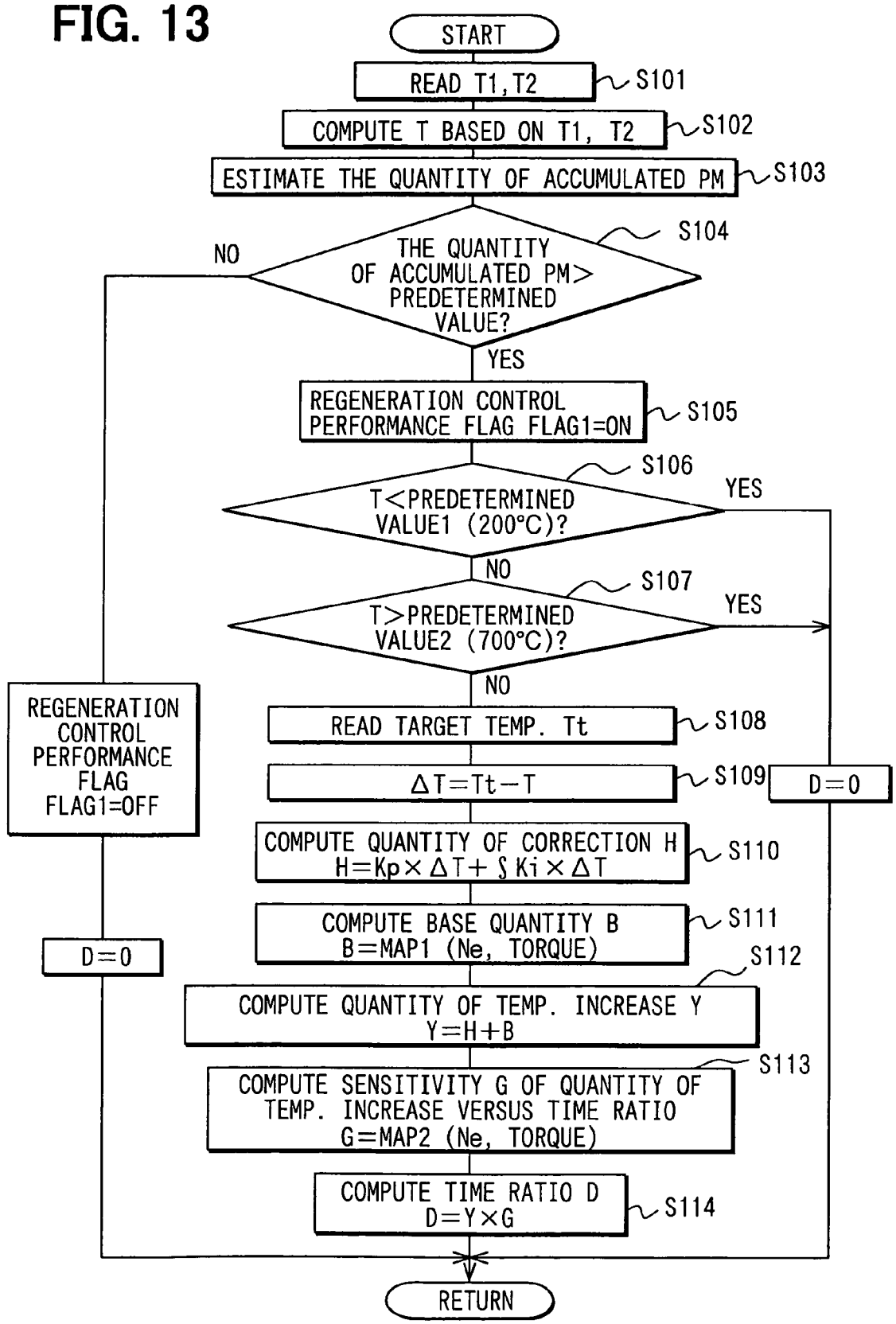

EXHAUST EMISSION CONTROL DEVICE OF INTERNAL COMBUSTION ENGINE

CROSS REFERENCE TO RELATED APPLICATIONS

This application is based upon and claims the benefit of priority of Japanese Patent Application No. 2004-139915, filed on May 10, 2004, the contents of which are incorporated herein by reference.

FIELD OF THE INVENTION

The present invention relates to an exhaust emission control device of an internal combustion engine having a particulate filter disposed in an exhaust passage for improving drivability during a temperature increase regeneration of the particulate filter.

BACKGROUND OF THE INVENTION

In recent years, an exhaust emission control device, which treats exhaust gas discharged from an internal combustion engine with a catalyst or a filter to reduce the discharge of toxic components, has gained importance as an environmental protection measure. For example, an exhaust emission control device has been known in which a diesel particulate filter (hereinafter referred to as "DPF") is disposed in an exhaust pipe to collect particulate matters (hereinafter referred to as "PM") discharged from the diesel engine. The DPF is regenerated by combusting and eliminating the accumulated PM regularly and, hence, can be used continuously.

The regeneration of the DPF is performed by increasing the temperature of the DPF to a certain temperature, for example 600° C. or more, at which the particulate matters can be combusted, when the quantity of the accumulated PM calculated based on a pressure difference across the DPF reaches a predetermined value. At this time, temperature increasing means includes means of post-injection, retardation of fuel injection timing, restriction of intake air and the like. However, such temperature increasing means cause deterioration of fuel consumption.

On the other hand, as a regeneration temperature is increased, the combustion rate of the PM is increased and, hence, the regeneration is finished in a short time so that the deterioration of fuel consumption caused by the regeneration of the DPF can be reduced. However, if the temperature of the DPF is too high, there is a possibility of causing the DPF to be broken or an oxidation catalyst supported by the DPF to deteriorate. Hence, to prevent the deterioration of fuel consumption and to regenerate the DPF safely, the temperature of the DPF needs to be maintained near a predetermined temperature. Therefore, usually, the temperature of exhaust gas upstream or downstream of the DPF is sensed and the temperature increasing means is operated such that the detected temperature becomes a target temperature.

For example, Japanese patent document JP-11-101122A discloses the following control method: the temperature of exhaust gas upstream of the DPF is detected as a DPF temperature and when the DPF temperature becomes higher than a predetermined temperature (for example, 500° C.), a temperature increasing operation is interrupted and when the DPF temperature becomes lower than the predetermined temperature (for example, 500° C.), the temperature increasing operation is performed. However, changes in the temperature of the DPF caused by the temperature increasing operation develop time lag. Hence, the method disclosed in JP-11-101122A, in which the temperature increasing operation is performed or interrupted after temperature changes are sensed, causes large variations in temperature and hence is hard to keep the temperature of the DPF near the target temperature.

The inventors of the present invention studied a method for controlling an operation of increasing a DPF temperature with higher accuracy and proposed a method of controlling the quantity of operation of increasing temperature by controlling the ratio between a time period during which a temperature increasing operation is performed and a time period during which the operation is interrupted (hereinafter referred to as "time ratio between the performance and interruption of a temperature increasing operation"). An example of such is disclosed in Japanese Patent Application No. 2003-94851. The time ratio is expressed by the ratio of a period $\tau 1$ during which the temperature increasing operation is performed to a predetermined basic period $\tau a$, as shown, for example, in FIG. 12A. By performing the post-injection of the temperature increasing means at this time ratio, the quantity of supply of HC can be controlled stepwise or continuously to control the DPF temperature optimally, as shown in FIG. 12B. Further, by controlling the state of injection suitably (for example, by correcting injection timing and the quantity of injection suitably) such that the torque when the temperature increasing operation is performed is equal to the torque when the temperature increasing operation is interrupted, torque shock can be prevented at the time of switching the temperature increasing operation.

However, there has been presented a problem that when the state of combustion varies from the initial shipment due to age deterioration of an injection system, a torque difference is caused by switching between performing the temperature increasing operation and stopping the operation to develop a periodic torque shock at intervals of the basis of the time ratio. In this case, there is a possibility that the periodic torque shock may be transmitted to a driver to cause the deterioration in drivability.

SUMMARY OF THE INVENTION

Therefore, the present invention reduces torque shock caused by switching between a state in which fuel is injected to increase temperature (temperature increasing operation is performed) and a state in which fuel is injected normally (temperature increasing operation is interrupted) during the regeneration of the DPF and to perform a control of increasing the temperature of a DPF with high accuracy without impairing drivability.

In an exhaust emission control device according to one aspect of the present invention, temperature increase quantity controlling means controls the quantity of temperature increase by temperature increasing means according to the output of temperature estimating means when the quantity of accumulated particulates, which is estimated by particulate accumulation quantity estimating means, exceeds a predetermined value. Time ratio computing means computes a time ratio between the performance and interruption of a temperature increasing operation by the use of the output of the temperature increase quantity controlling means. Base period computing means computes a period that becomes the base of the time ratio such that the period varies from time to time. Switching means switches between the performance and interruption of the temperature increasing operation by the temperature increasing means based on this time ratio and the period that becomes the base.

To prevent periodic torque shock caused in the period that becomes the base of the time ratio, there is provided the base period computing means to bring about a state where the period that becomes the base of the time ratio is not fixed. When periodic torque shock transmitted to the driver occurs continuously, drivability deteriorates. However, when the invention is applied to the exhaust emission control device, the period of occurrence of torque shock is brought into being not constant, which can prevent the deterioration of drivability.

In another aspect of the present invention, the base period computing means computes the period that becomes the base such that the period varies at random.

By bringing the period that becomes the basis of the time ratio into a random state, the period of occurrence of torque shock becomes random. Therefore, it is possible to prevent the occurrence of periodic torque shock and hence to prevent the deterioration of drivability.

In another aspect of the present invention, the switching means switches between the performance and interruption of the temperature increasing operation such that a period of performing and interrupting the temperature increasing operation is different from the period that becomes the base as the time ratio is kept within the period that becomes the base.

For example, when the time ratio is 50%, the temperature increasing means is operated in such a way that the period that becomes the base is different from the period of repeating the performance and interruption of the temperature increasing operation as the ratio between the sum "a" of the number of combustions of the temperature increasing operation within the period that becomes the base and the number of combustions "b" within the period is kept at 50% (a/b=0.5). With this, it is possible to prevent the periodic torque shock for each base period and to prevent the deterioration of drivability.

In yet another aspect of the present invention, the switching means switches between the performance and interruption of the temperature increasing operation so that a period of performing and interrupting the temperature increasing operation is changed at random as the time ratio is kept within the period that becomes the base.

For example, when the time ratio is 50%, the order of performing the temperature increasing operation is switched at random as the ratio between the sum "a" of the number of combustions of the temperature increasing operation within the period that becomes the base and the number of combustions "b" within the period is kept at 50% (a/b=0.5). With this, it is possible to prevent specific periodic torque shock and to prevent the deterioration of drivability.

In yet another aspect of the present invention, the time ratio computing means corrects the state of fuel injection either when the temperature increasing operation is performed or when the temperature increasing operation is interrupted by the use of the number of revolutions of an internal combustion engine when the temperature increasing operation is performed and the number of revolutions of the internal combustion engine when the temperature increasing operation is interrupted.

When variations in torque are produced when the temperature increasing operation is performed and when the temperature increasing operation is interrupted, variations in the number of revolutions of the internal combustion engine are produced by the variations in torque. By detecting the variations in the number of revolutions of the internal combustion engine and by correcting the state of fuel injection, for example, the quantity of main injection and/or the timing of main injection, it is possible to correct the variations in torque produced when the temperature increasing operation is performed and when the temperature increasing operation is interrupted.

A still further aspect of the present invention includes operation prohibiting means for prohibiting any one of operations of the time ratio computing means, the base period computing means, and the switching means when the number of revolutions or torque of the internal combustion engine is within a predetermined limited region.

Operations according to the above-described different aspects of the present invention prevent torque shock and increase a computing load. On the other hand, the driver is hard to feel abnormality caused by torque shock within a rapid acceleration operating region such as a large number of revolutions and heavy load. Therefore, by prohibiting these operations within this region, it is possible to reduce computing load.

A still further aspect of the present invention includes abnormality determining means that determines that a temperature increasing operation is abnormal when the quantity of correction is larger than a predetermined value.

By determining the predetermined value based on variations thought to be caused by deterioration, when a quantity of correction larger than the predetermined value needs to be made, it is possible to determine that some abnormality is caused by the temperature increasing operation.

A still further aspect of the present invention includes regeneration interrupting means for stopping regenerating the particulate filter when the quantity of correction is larger than a predetermined value.

When a quantity of correction larger than the value predetermined based on variations thought to be caused by deterioration needs to be made, there is a possibility that some abnormality is caused by the temperature increasing operation. Therefore, by interrupting the regeneration, it is possible to avoid a trouble caused by the abnormality of the temperature increasing operation.

Other features and advantages of the present invention will be appreciated, as well as methods of operation and the function of the related parts from a study of the following detailed description, appended claims, and drawings, all of which form a part of this application. In the drawings:

BRIEF DESCRIPTION OF THE DRAWINGS

FIG. 13 is a flowchart of a regeneration control for computing a time ratio according to a first embodiment of the present invention;

DETAILED DESCRIPTION OF THE PREFERRED EMBODIMENTS

Figure 1:
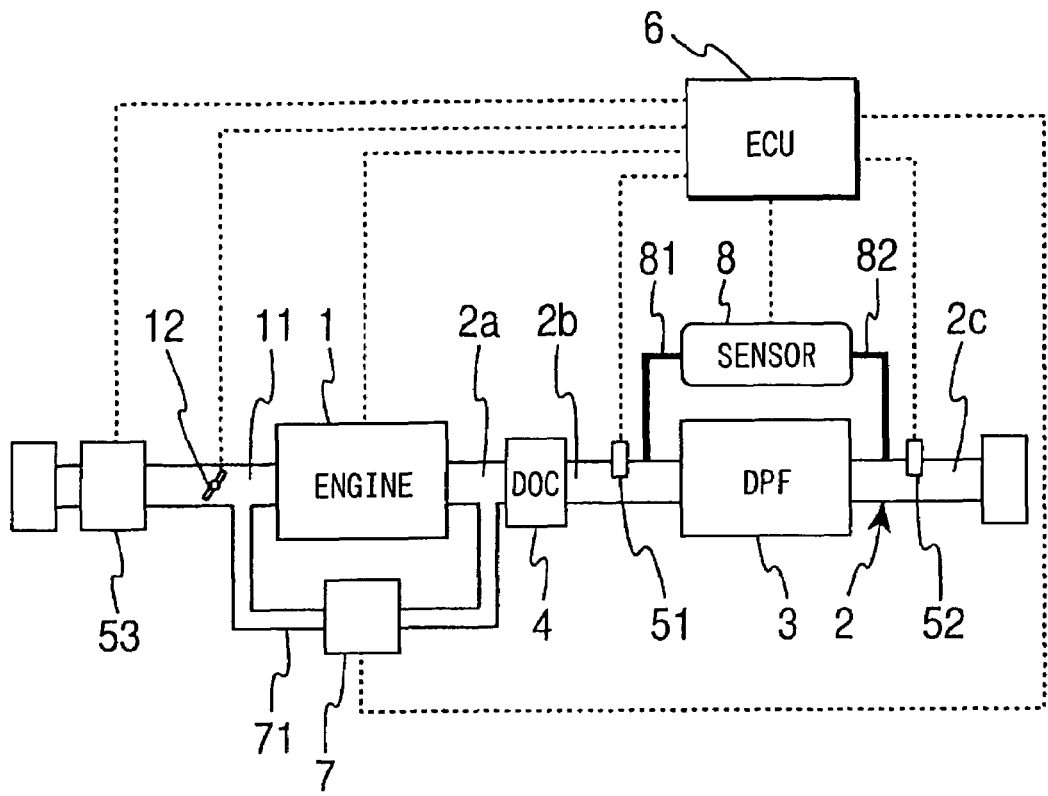
FIG. 1 is a schematic diagram of an exhaust emission control device of an internal combustion engine according to the present invention.

Hereafter, the present invention will be described based on the drawings. FIG. 1 shows the general construction of an exhaust emission control device of a diesel engine. A diesel particulate filter (DPF) 3 is interposed between exhaust pipes 2b, 2c constructing the exhaust passage 2 of a diesel engine 1 and an oxidation catalyst (DOC) 4 is interposed between exhaust pipes 2a, 2b upstream of the DPF 3. The DPF 3 is a ceramic filter having a publicly known structure and is formed of heat-resistant ceramic such as cordierite in the shape of honeycomb structure in which many cells as gas passages are provided in such a staggered manner that inlet or outlet of each cell is blocked by each other. The exhaust gas discharged from the engine 1 flows downstream while passing through the porous partition walls of the DPF 3. At that time, particulate matters (PM) are collected and accumulated gradually in the DPF 3.

The DOC 4 is of a publicly known construction in which a ceramic supporting member formed of a cordierite honeycomb structural body or the like supports an oxidation catalyst on its surface. The DOC 4 burns hydrocarbon (HC) supplied into the exhaust passage 2 through catalytic reaction to increase an exhaust temperature to increase the temperature of the DPF 3. Here, the DPF 3 may support an oxidation catalyst or may not. In this embodiment, description will be provided assuming that the DPF 3 does not support an oxidation catalyst. Alternatively, a device construction, in which a DPF 3 supporting an oxidation catalyst is disposed but a DOC 4 is not provided upstream of the DPF 3, may be employed.

Exhaust temperature sensors 51, 52 as temperature sensing means are disposed in the exhaust pipe 2b upstream of the DPF 3 and in the exhaust pipe 2c downstream of the DPF 3. The exhaust temperature sensors 51, 52 are connected to an ECU 6 and sense the temperatures of gases entering into and exiting from the DPF 3 and output the temperatures to the ECU 6. The ECU 6 estimates the temperature (central temperature) of the DPF 3 based on the outputs of the exhaust temperature sensors 51, 52. An air flow meter (intake flow rate sensor) 53 is disposed in an intake pipe 11 of the engine 1 to output an intake flow rate to the ECU 6. An intake throttle valve 12 is disposed in the intake pipe downstream of the air flow meter 53 to increase or decrease the intake flow rate according to the command of the ECU 6. Further, the intake pipe 11 of the engine 1 communicates with the exhaust pipe 2a upstream of the DOC 4 through an EGR pipe 71 having an EGR valve 7. The EGR valve 7 increases or decreases the quantity of exhaust gas (the quantity of EGR) recirculated to the intake air according to the command of the ECU 6.

A pressure difference sensor 8 for sensing a pressure difference across the DPF 3 is connected to the exhaust pipes 2b, 2c so as to estimate the quantity of particulate matters collected and accumulated in the DPF 3 (the quantity of accumulated PM). One end of the pressure difference sensor 8 is connected to the exhaust pipe 2b upstream of the DPF 3 through a pressure introducing pipe 81 and the other end is connected to the exhaust pipe 2c downstream of the DPF 3 through a pressure introducing pipe 82. Thus, the pressure difference sensor 8 outputs a signal corresponding to a pressure difference across the DPF 3 to the ECU 6.

Various sensors (not shown) such as accelerator position sensor and revolution speed sensor are connected to the ECU 6. The ECU 6 detects an operating state based on the sensing signals from these sensors and computes an optimum fuel injection quantity, optimum injection timing, an optimum injection pressure, and the like in accordance with to the operating state and controls the fuel injection to the engine 1. Further, the ECU 6 regulates the degree of opening of the intake throttle valve 12 to control the intake flow rate and regulates the degree of opening of the EGR valve 7 to control the quantity of EGR.

Figure 2:
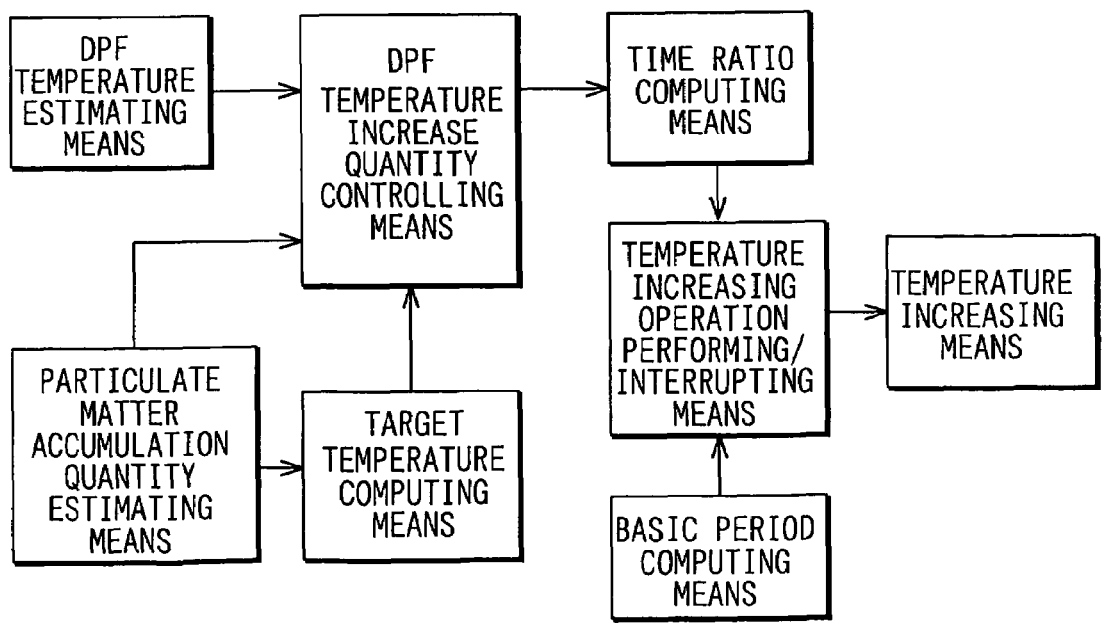
FIG. 2 is a flow diagram of a regeneration control process according to the present invention.

Next, the regeneration control of the DPF 3 will be described. The ECU 6 has a regeneration control function as shown in FIG. 2: the ECU 6 estimates the quantity of PM accumulated in the DPF 3 (particulate matter accumulation quantity estimating means); when the quantity of accumulated PM exceeds a predetermined value, the ECU 6 controls the quantity of temperature increase in the DPF by a DPF estimation temperature computed by DPF temperature estimating means and a target temperature computed by target temperature computing means (DPF temperature increase quantity controlling means); the ECU 6 computes a time ratio between the performance and interruption of a temperature increasing operation from the output of this DPF temperature increase quantity controlling means (time ratio computing means) and computes a base period for the time ratio (base period computing means) and switches between the performance and interruption of a temperature increasing operation based on the computed time ratio and the base period (temperature increasing operation performing/interrupting means); and the ECU 6 increases the quantity of HC in the exhaust gas based on a switching command from the temperature increasing operation performing/interrupting means by temperature increasing means to increase the temperature of the DPF 3 through HC reaction heat developed in the DOC 4. In this manner, the accumulated PM are burned and removed, whereby the DPF 3 is regenerated.

To be specific, the temperature increasing means performs post-injection, retarding fuel injection timing (retardation), throttling intake air, increasing the quantity of EGR, and the like. Through these operations, the quantity of unburned HC supplied to the exhaust passage 2 is increased. Further, the exhaust temperature is increased through the operations of retarding fuel injection timing and increasing the quantity of EGR. Further, it is also recommended that a fuel adding unit 9 be disposed in the exhaust pipe 2a upstream of the DOC 4 to supply HC directly to the exhaust gas. The temperature increasing means may perform any one of these operations or may perform a plurality of operations in combination.

The particulate matter accumulation quantity estimating means estimates the quantity of accumulated PM from the pressure difference across the DPF 3 sensed by the pressure difference sensor 8. When the flow rate of the exhaust gas is constant, the pressure difference across the DPF 3 increases as the quantity of accumulated PM increases. Hence, the quantity of accumulated PM can be estimated by obtaining the relationship between them in advance. Alternatively, the quantity of accumulated PM may be estimated based on operating state of the engine 1 sensed from the outputs of various kinds of sensors or may be estimated by a combination of these methods.

The DPF temperature estimating means here estimates the DPF temperature based on the outputs of the exhaust temperature sensors 51, 52 disposed upstream and downstream of the DPF 3. However, it is also recommendable to employ a device construction having only one of the exhaust temperature sensors 51, 52 and to estimate the DPF temperature from the temperature of exhaust gas upstream or downstream of the DPF 3. Further, it is also recommendable to input operating conditions and to estimate the DPF temperature based on the conditions.

The target temperature computing means computes a target temperature by inputting operating conditions such as engine speed and torque and the estimated quantity of accumulated PM. It is desirable to set the target temperature at as high a temperature as possible within a region in which the particulate matters are not rapidly burned (for example, 600° C. or more), whereby the particulate matters can be burned and removed with high efficiency.

The DPF temperature increase quantity controlling means determines the quantity of energy to be applied by the temperature increasing means according to the temperature of the DPF 3 estimated by the temperature estimating means. To be specific, the quantity of temperature increase in the DPF (hereinafter referred to as "DPF temperature increase quantity") is computed from the difference between the estimated temperature of the DPF and the target temperature by the use of a control method such as classical control method (PI feedback control, PID feedback control, or the like), modern control method (state feedback control that uses the history of temperature change and the history of the quantity of past operation of the temperature increasing means as the quantity of state), or predictive control method (control of computing the quantity of temperature increase from the difference between a predicted temperature, which is computed from an operating state and the quantity of operation of the temperature increasing means, and a target temperature).

Figure 3A:
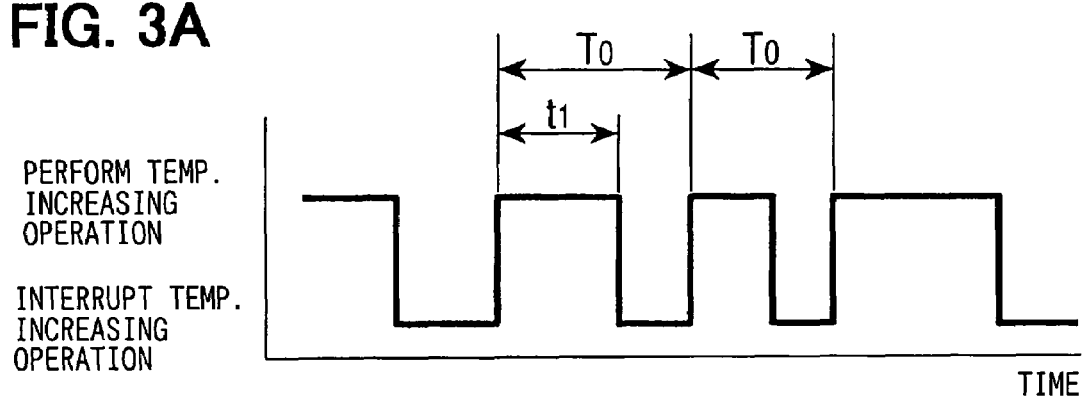
FIG. 3A is a graph of a time ratio between the performance and interruption of a temperature increasing operation in accordance with the present invention and a period for its bases.

The time ratio computing means computes the time ratio between the performance and interruption of a temperature increasing operation by multiplying the DPF temperature increase quantity, for example, by the sensitivity characteristic of the quantity of temperature increase versus the time ratio, which is suitably obtained in advance in a two-dimensional map of engine speed and torque. As shown in FIG. 3A, the time ratio is expressed by the ratio of a time period t1 during which the temperature increasing operation is performed to a period T0 that becomes a base period for the time ratio (hereinafter referred to as "base period"; for example, 3 seconds) (t1/T0; t1≦T0), and the DPF temperature increase quantity increases as the time ratio increases.

Figure 4:
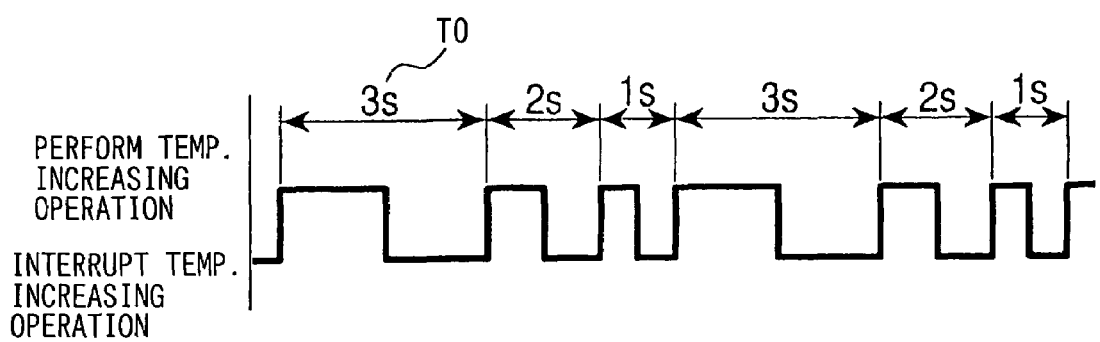
FIG. 4 is a graph of a method of computing a period for a time ratio according to the present invention.
Figure 5:
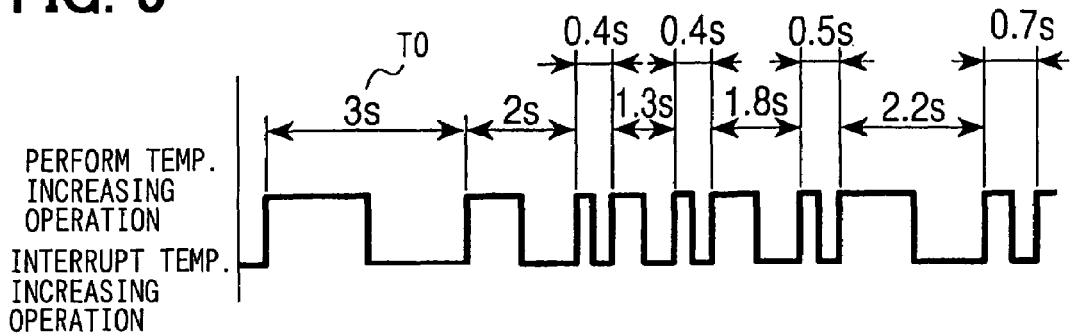
FIG. 5 is a graph of an alternative method of computing a period for the base of a time ratio according to the present invention.

In the invention, in order to prevent the base period T0 for the time ratio from being fixed, base period computing means is provided and the base period T0 is changed from time to time. The base period T0 may be changed regularly as shown in FIG. 4 or may be changed at random as shown in FIG. 5. By bringing about a state where the base period T0 is not fixed, it is possible to avoid drivability from deteriorating due to periodic torque shock.

Figure 3B:
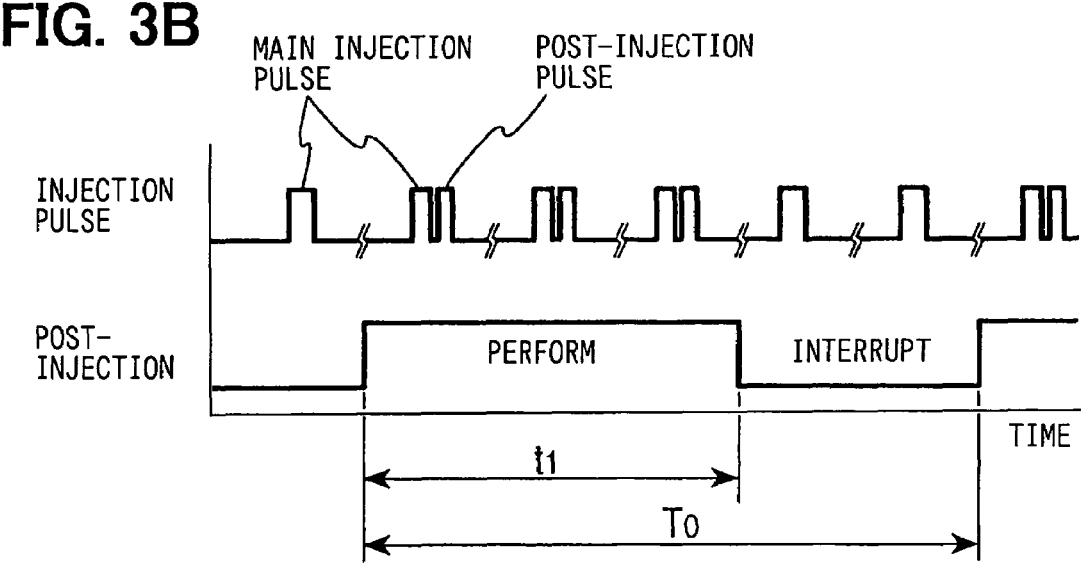
FIG. 3B is a graph that shows the temperature increasing operation based on the time ratio when a temperature increasing means is post-injection according to the present invention.

The temperature increasing operation performing/interrupting means switches between the performance and interruption of a temperature increasing operation so as to keep the computed time ratio in the base period T0 changed from time to time. The time ratio is changed by changing the ratio of a time period t1, during which the temperature increasing operation is performed, to the base period T0 (0 to 100%). Describing this in the case where the temperature increasing means is post-injection, as shown in FIG. 3B, this corresponds to changing the ratio between a period during which post-injection is performed and a period during which the post-injection is not performed (interrupted). In this manner, by performing the temperature increasing operation with the time ratio set in accordance with the DPF temperature increase quantity, the temperature of the DPF 3 can be easily kept in the vicinity of the target temperature.

When the temperature increasing means performs the temperature increasing operation at a time ratio of 100%, the temperature increasing means increases the temperature of the DPF 3 such that the temperature of the DPF 3 becomes a predetermined temperature higher than the target temperature under respective operating conditions. This will be described as follows; in the case where the temperature increasing means is post-injection, for example, in the case where the post-injection is performed for respective engine speeds and accelerator positions, post-injection quantities such that the temperature of the DPF 3 becomes a predetermined temperature (for example, 750° C.) after a sufficient time elapses are stored as a two-dimensional map of engine speed and accelerator position.

Here, when the post-injection is performed, there is a case where part of the post-injection quantity is used for producing torque to make a difference in torque as compared with a case where the post-injection is not performed. Hence, when the post-injection is performed, in order to avoid this difference in torque and to develop the same torque, it is recommendable to determine a decrease in the main injection quantity in advance so as to produce the same torque when the post-injection is performed.

Figure 6:
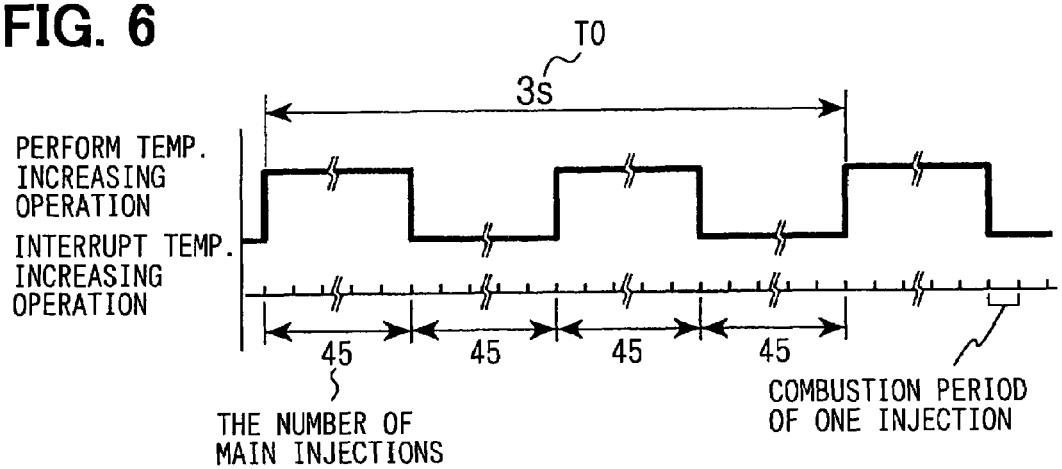
FIG. 6 is a graph of a method of switching between performing and interrupting a temperature increasing operation in a period for the base of a time ratio according to the present invention.
Figure 7:
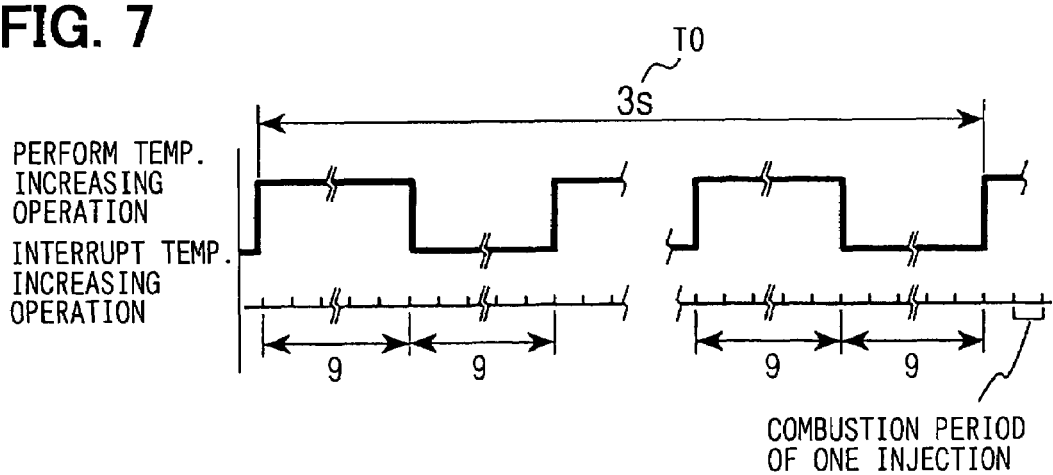
FIG. 7 is a graph of a method of switching between performing and interrupting a temperature increasing operation in a period for the base of a time ratio according to the present invention.

It is preferable to make a period of performing and interrupting the temperature increasing operation different from the base period T0 while keeping the time ratio within the base period T0. For example, in a system capable of performing and interrupting the temperature increasing operation every one combustion, in the case where the base period T0 for the time ratio is 3 seconds and an engine is a four-cylinder engine and an engine speed is 1800 rpm, 180 combustions occur within the base period T0. In the case of the time ratio of 50%, if the temperature increasing operation is switched in a manner of 90 temperature increasing operations (post-injections) in succession→90 normal injections (interruptions of temperature increasing operation) in succession, the period of performing and interrupting the temperature increasing operation becomes the same as the base period. However, as shown in FIG. 6, it is recommended that the temperature increasing operation be switched in a manner of 45 temperature increasing operations in succession→45 normal operations in succession→45 temperature increasing operations in succession→45 normal operations in succession, and so on. Alternatively, as shown in FIG. 7, it is recommended that the temperature increasing operation be switched in a manner of 9 temperature increasing operations in succession ~9 normal operations in succession→ . . . →9 temperature increasing operations in succession→9 normal operations in succession, and so on. In this manner, by making the period of repeating the performance and interruption of the temperature increasing operation different from the base period T0, it is possible to prevent periodic torque shock from developing at intervals of the base period T0 and hence to prevent drivability from deteriorating.

Figure 8:
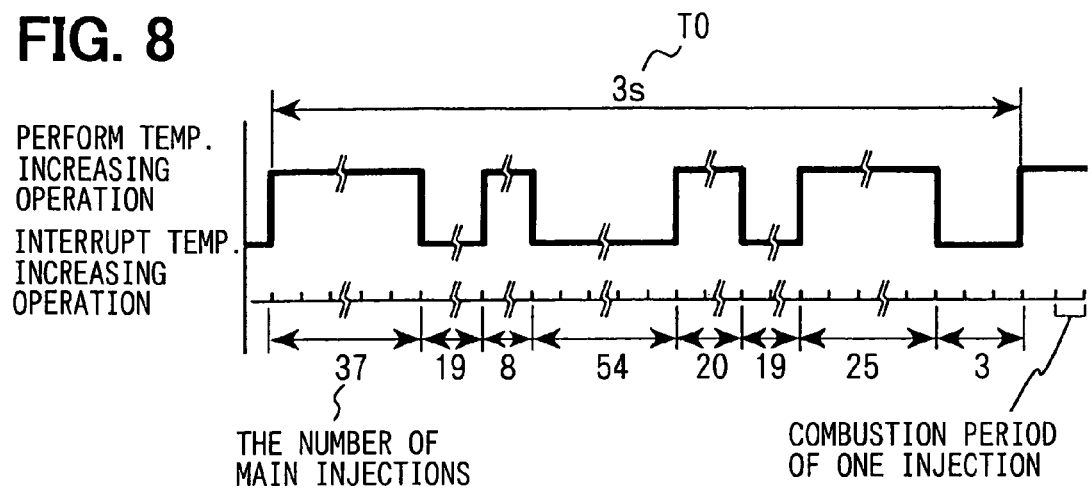
FIG. 8 is a graph of a method of switching a period of repeating the performance and interruption of a temperature increasing operation at random in a period for the base of a time ratio according to the present invention.

Alternatively, the period of performing and interrupting the temperature increasing operation is switched at random while keeping the time ratio within the base period T0. For example, in the case where the base period T0 of the time ratio is 3 seconds and an engine is a four-cylinder engine and an engine speed is 1800 rpm, 180 combustions occur within the base period T0. In the case where the time ratio is 50%, as shown in FIG. 8, in order to keep the time ratio at 50%, the temperature increasing operation is switched in such a manner that the ratio between the total sum of the number of combustions under the temperature increasing operations (37+8+20+25=90) and the total sum of the number of combustions (37+14+8+54+20+19+25+3=180) within the base period T0 is equal to 50% (90/180=0.5) and that the temperature increasing operations are performed or interrupted in random order. With this operation, it is possible to prevent the occurrence of specific periodic torque shock and hence to prevent the deterioration of drivability.

Figure 9:
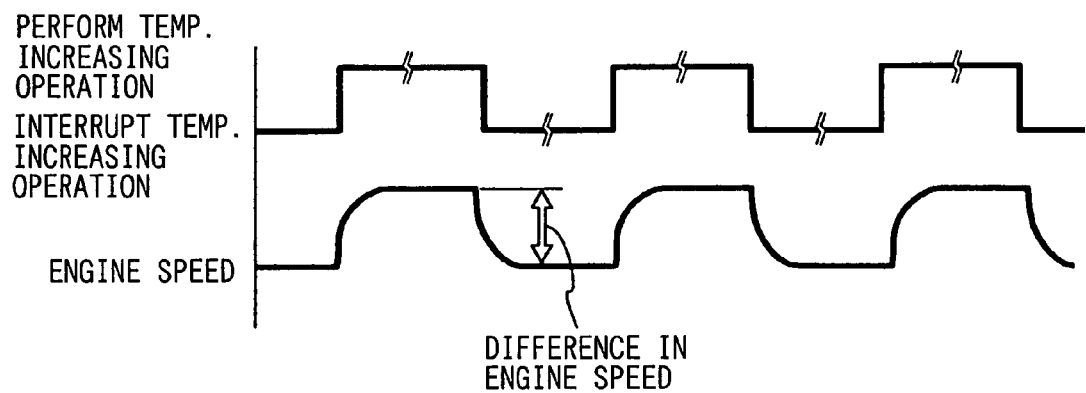
FIG. 9 is a graph of a method of correcting the state of fuel injection from a variation in the engine speed when a temperature increasing operation is performed and interrupted according to the present invention.

Further, it is also possible to correct either the state where fuel is injected for the temperature increasing operation or the state where fuel is injected normally (the temperature increasing operation is interrupted) by the use of the engine speed when the temperature increasing operation is performed and the engine speed when the temperature increasing operation is interrupted. As shown in FIG. 9, in the case where a torque difference occurs between when the temperature increasing operation is performed and when the temperature increasing operation is interrupted, a difference in the engine speed is caused by the torque difference. Hence, by detecting the difference in the engine speed and by correcting the state of fuel injection, for example, main fuel injection quantity and main fuel injection timing, the torque difference between when the temperature increasing operation is performed and when the operation is interrupted can be corrected.

Figure 10:
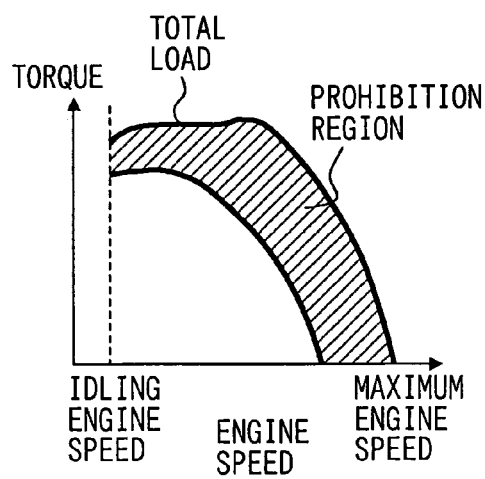
FIG. 10 is a graph of one region where correction is prohibited according to the present invention.
Figure 11:
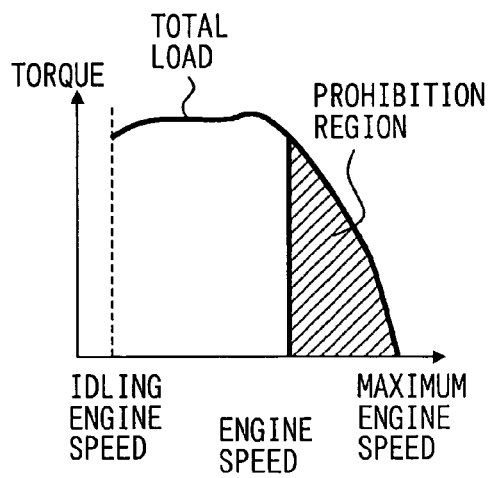
FIG. 11 is a graph of an alternative region where correction is prohibited according to the present invention.
Figure 12A:
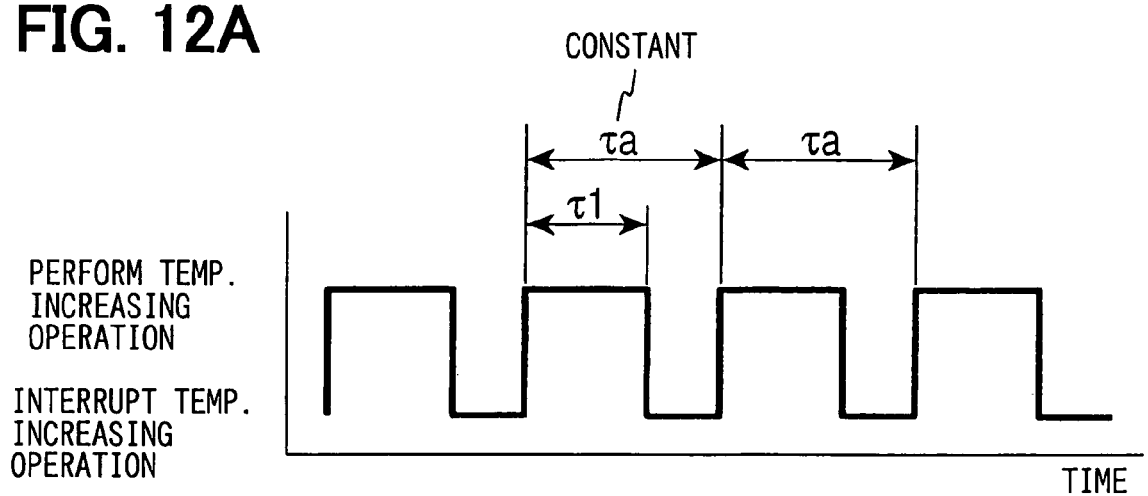
FIG. 12A is a graph showing a constant period for the base of a time ratio between the performance and interruption of a temperature increasing operation according to the present invention.
Figure 12B:
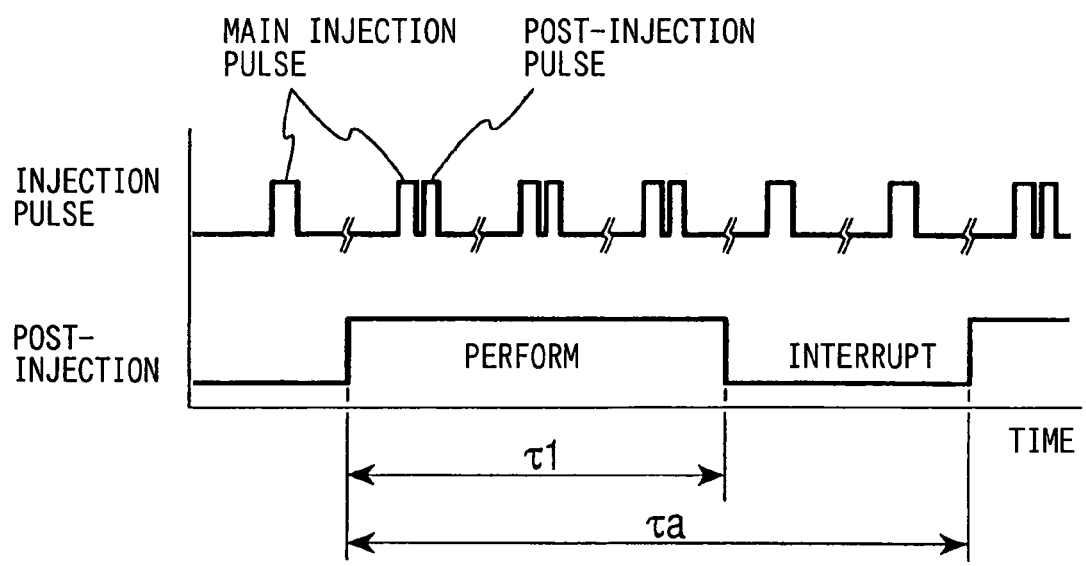
FIG. 12B is a graph of a temperature increasing operation based on the time ratio when post-injection is used according to the present invention.

Still further, an effect of preventing the torque shock can be produced by the operation described above, but there is presented a problem of increasing computing load. On the other hand, the torque shock is affected by the engine speed and the load and hence the driver is less prone to feel abnormal when torque shock occurs within an operating region of rapid acceleration such as high engine speed and heavy load. Hence, it is possible to reduce the computing load by prohibiting these operations (operation prohibiting means) at least in one of regions including a region determined by the engine speed and a region determined by the torque. FIG. 10 shows an example of a prohibition region determined by the engine speed and the torque, and FIG. 11 shows an example of another prohibition region determined by the engine speed.

In the case of correcting the state of fuel injection from a difference in the engine speed, the quantity of correction can be applied to the determination of abnormality. To be more specific, a specific value is determined in advance from variations predicted from deterioration and when the quantity of correction becomes larger than the specific value, it is determined that the temperature increasing operation is abnormal (abnormality determining means). By determining the specific value, if there occurs a case where a correction larger than the specific value needs to be made, it is possible to determine that some abnormality is caused by some temperature increasing operation.

Further, when a correction larger than the specific value determined in advance needs to be made, the regeneration is interrupted (regeneration interrupting means). In this case, there is a possibility that some abnormality occurs in the temperature increasing operation. Hence, by interrupting the regeneration, it is possible to avoid a trouble caused by the abnormal operation.

Figure 14:
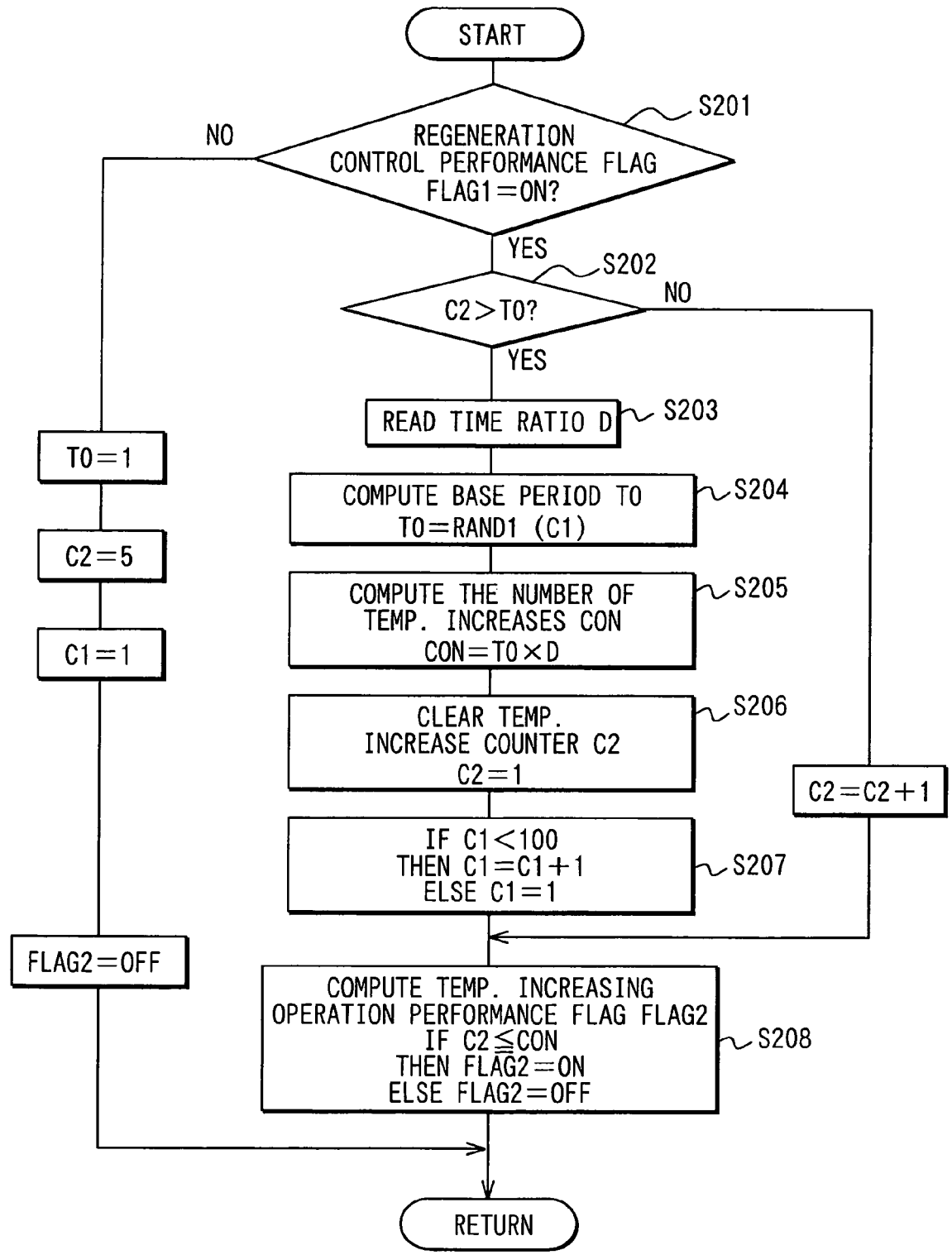
FIG. 14 is a flow chart of a control for switching between the performance and interruption of a temperature increasing operation according to the first embodiment of the present invention.

The first embodiment of the regeneration control of the DPF 3 by the ECU 6 is shown in FIGS. 13, 14. FIG. 13 is a flow chart for computing the time ratio D between the performance and interruption of a temperature increasing operation by the temperature increasing means. First, at Step 101, the ECU 6 reads exhaust temperatures T1, Ts from the exhaust temperature sensors 51, 52 disposed upstream and downstream of the DPF 3. At Step 102, the ECU 6 computes a DPF estimation temperature T based on the exhaust temperatures T1, T2 upstream and downstream of the DPF 3. Here, the ECU 6 computes the DPF estimation temperature T from the exhaust temperatures T1, T2 but, for simplicity, it is also possible to let T=T1 or T=T2. At Step 103, the ECU 6 estimates the quantity of PM accumulated in the DPF 3. For example, the quantity of accumulated PM can be estimated based on the pressure difference across the DPF 3 sensed by the pressure difference sensor 8 and the flow rate of exhaust gas computed from the output of the air flow meter 53 by use of the relationship between the pressure difference across the DPF 3 for the flow rate of exhaust gas passing through the DPF 3 and the quantity of PM accumulated in the DPF 3.

At Step 104, it is determined whether or not the estimated quantity of accumulated PM is larger than a predetermined value (for example, 4 g/L) at which the DPF 3 needs to be regenerated. If the estimated quantity of accumulated PM is greater than the predetermined value, it is determined that the DPF 3 needs to be regenerated and then the routine proceeds to Step 105 and subsequent steps where an operation of increasing the temperature of the DPF 3 is performed. As the operation of increasing the temperature of the DPF 3, for example, post-injection is performed, to be specific, a small quantity of fuel is additionally injected after main fuel injection for driving the engine (expansion stroke after top dead center) to generate unburned HC. This HC produces heat through an oxidation reaction at the DOC 4 to supply the DPF 3 with the exhaust gas of high temperature.

At Step 105, a regeneration control performance flag Flag1 is set ON and the routine proceeds to Step 106. If it is not determined at Step 104 that the quantity of accumulated PM is greater than the predetermined value, the regeneration control performance flag Flag1 is set OFF and the time ratio D is set at 0% and the processing is finished without performing post-injection.

At Step 106, the DPF estimation temperature T is compared with a predetermined value 1 (for example, 200° C.). The predetermined value 1 is a temperature of activating the oxidation catalyst and if T is less than the predetermined value 1 (for example, 200° C.), the oxidation catalyst is not activated and hence even if HC is supplied to the DOC 4, an effect of increasing temperature can not be produced. Hence, the time ratio D is set at 0% and the post-injection is interrupted. If it is not determined at Step 106 that T is less than the predetermined value 1, at subsequent Step 107, the DPF estimation temperature T is compared with a predetermined value 2 (for example, 700° C.). If T is greater than the predetermined value 2 (for example, 700° C.), there is a possibility that the oxidation catalyst is degraded and the DPF 3 is broken, and hence also in this case, the time ratio D is set at 0% and the post-injection is interrupted.

If it is not determined at Step 107 that T is greater than the predetermined value 2, the routine proceeds to Step 108 where a target temperature Tt is read. The target temperature Tt is computed by another routine based on operating conditions including the quantity of accumulated PM, engine speed and torque. In order to prevent the deterioration of fuel consumption, it is preferable to set the target temperature Tt at as high a temperature as possible (for example, 650° C.) below a DPF temperature at which the PM are rapidly burned.

At Step 109, a temperature difference ΔT between the target temperature Tt and the DPF estimation temperature T is computed. At subsequent Step 110, the quantity of correction is computed based on this temperature difference ΔT. Here, it is assumed that a feedback correction quantity is computed by the use of proportional integral (PI) control of classical control and a computing equation is shown in the drawing. Further, at Step 111, the quantity of temperature increase (base quantity B) that becomes a base is computed for each operating condition. The base quantity B is computed, for example, by the use of a two-dimensional map of engine speed NE and torque.

At Step 112, the sum of the quantity of correction H computed at Step 110 and the base quantity B computed at Step 111 is computed as the quantity of temperature increase Y. At Step 113, the sensitivity G related to the quantity of temperature increase and the time ratio is computed. The sensitivity G is computed by the use of a suitable value in the two-dimensional map of engine speed NE and torque. At Step 114, the time ratio D is computed by multiplying the quantity of temperature increase Y computed at Step 112 by the sensitivity G computed at Step 113.

Next, switching the temperature increasing operation based on this time ratio D will be described by the use of a flow chart shown in FIG. 14. It is preferable that this flow be computed for each combustion, to be specific, in the case of 4-cylinder engine, every ½ revolution. First, at Step 201, it is determined whether or not the regeneration control performance flag Flag1 is ON. If it is not determined at Step 201 that the regeneration control performance flag Flag1 is ON, variables to be used in this flow are initialized (base period T0 of time ratio D, T0=1; temperature increase counter C2=5, base period counter C1=1) and then a temperature increasing operation performance flag Flag2 is set OFF and the processing is finished. If it is determined at Step 201 that the regeneration control performance flag Flag1 is ON, the routine proceeds to Step 202.

Figure 15:
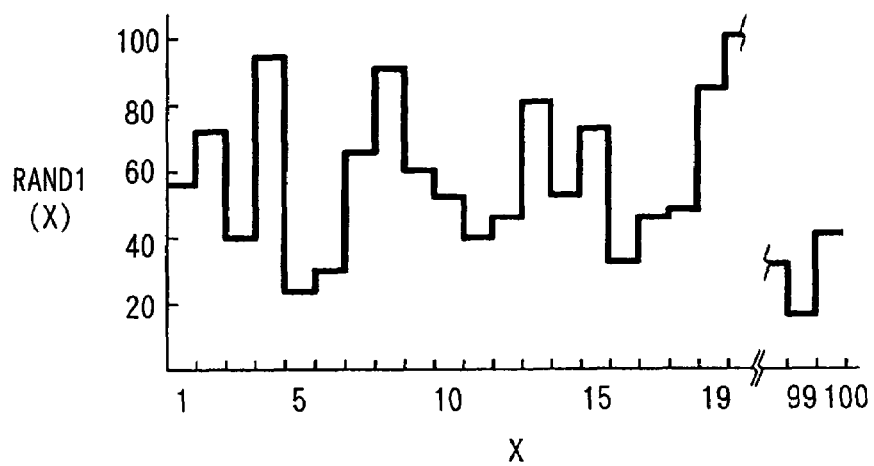
FIG. 15 is a graph of a function for computing a base period according to the present invention.

At Step 202, it is determined whether or not the base period T0 is to be updated. To be specific, it is determined whether or not the temperature increase counter C2 is larger than the base period T0. If it is determined that C2 is greater than T0, the routine proceeds to Step S203. If it is not determined that C2 is greater than T0, the temperature increase counter C2 is incremented and then the routine jumps to Step 208. At Step 203, the time ratio D is read and at Step 204, the base period T0 is computed. To be specific, the base period T0 is computed as RAND1 (C1), where the base period counter C1 is subtrahend. The RAND1 is a function of outputting integers from 1 to 100 at random for input (integers from 1 to 100). As for the RAND1, the relationship between input and output may be defined in advance. Further, the RAND1 does not necessarily need to output integers strictly at random and if the RAND1 does not output a constant integer, the effect of the invention can be expected. An example of the function RAND1 is shown in FIG. 15.

At Step 205, the number of temperature increases CON is computed. To be specific, the number of temperature increases CON is computed as the product of the base period T0 and the time ratio D. At Step 206, the temperature increase counter C2 is cleared (initialized). At Step 207, a base period counter C1 is incremented. If the base period counter C1 is larger than 100, the base period counter C1 is initialized. Next, at Step 208, the temperature increasing operation performance flag Flag2 is computed. Here, if the temperature increase counter C2 is smaller than the number of temperature increases CON, the temperature increasing operation performance flag Flag2 is set ON and if the counter C2 is not smaller than the number of temperature increases CON, the temperature increasing operation performance flag Flag2 is set OFF.

Figure 16:
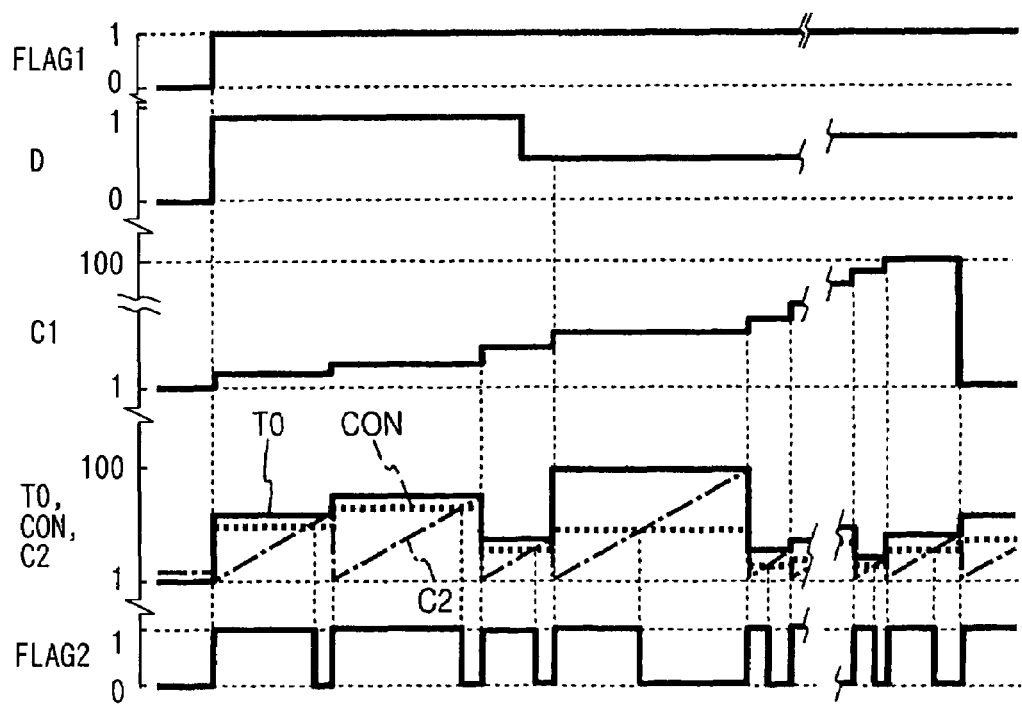
FIG. 16 is a timing chart of results of a regeneration control according to the first embodiment of the present invention.

FIG. 16 shows a computation example of this embodiment. As shown in the drawing, when regeneration control is started (Flag1=ON) and the time ratio D is computed according to the quantity of temperature increase Y, operation is switched between the performance of the temperature increasing operation (Flag2=ON) and the interruption of the temperature increasing operation (Flag2=OFF) so as to keep the time ratio D within the base period T0 varying at random. Therefore, this can prevent periodic torque shock caused by switching the operation and at the same time can make it possible to perform an optimum temperature increasing control and hence to prevent the deterioration of fuel consumption.

Figure 17:
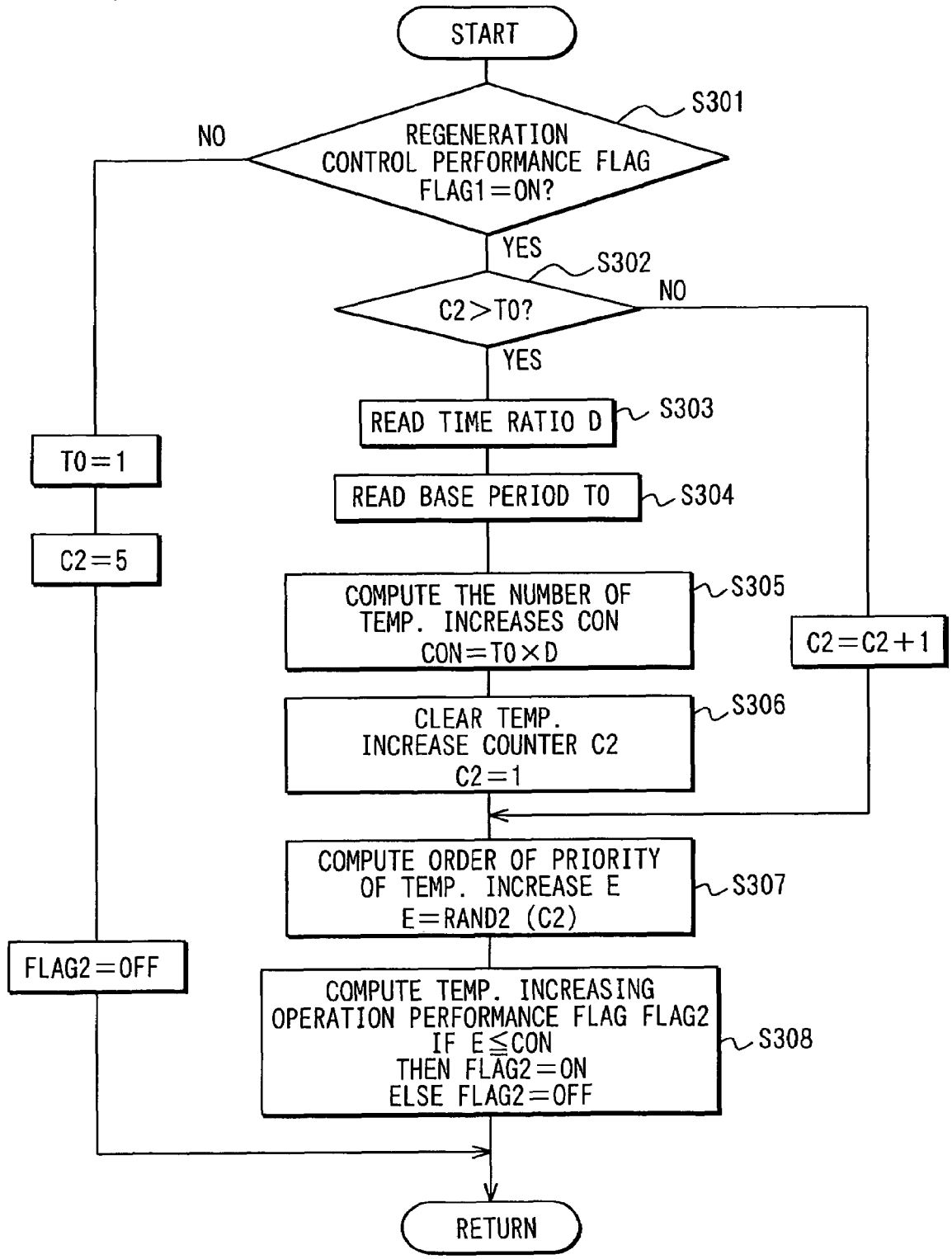
FIG. 17 is a flowchart of a regeneration control for computing the time ratio for switching between performance and interruption of a temperature increasing operation according to a second embodiment of the present invention.

FIG. 17 is a flow chart showing the second embodiment of the invention. The basic flow of the regeneration control is the same as shown in FIG. 13 and hence a method of changing a period of performing and interrupting the temperature increasing operation within the base period T0 will be mainly described. In FIG. 17, first, the ECU 6 determines at Step 301 whether or not the regeneration control performance flag Flag1 is ON. If negative determination is made at Step 301, variables to be used in this flow are initialized (base period T0 of time ratio D, T0=1, temperature increase counter C2=5) and the temperature increasing operation flag Flag2 is set OFF and this processing is finished. If affirmative determination is made at Step 301, the routine proceeds to Step 302.

At Step 302, it is determined whether or not the base period T0 is to be updated. To be specific, it is determined whether or not the temperature increase counter C2 is larger than the base period T0. If it is determined that C2>T0, the routine proceeds to Step 303 and if it is not determined that C2>T0, the counter C2 is incremented and the routine jumps to Step 307. At Step 303, the time ratio D is read and at Step 304, the base period T0 is read. The base period T0 is computed separately by the method described in the first embodiment or the like and here it is assumed that the base period T0 is, for example, 100. Next, at Step 305, the number of temperature increases CON is computed. To be specific, the number of temperature increases CON is computed as the product of the base period T0 and the time ratio D.

Figure 18:
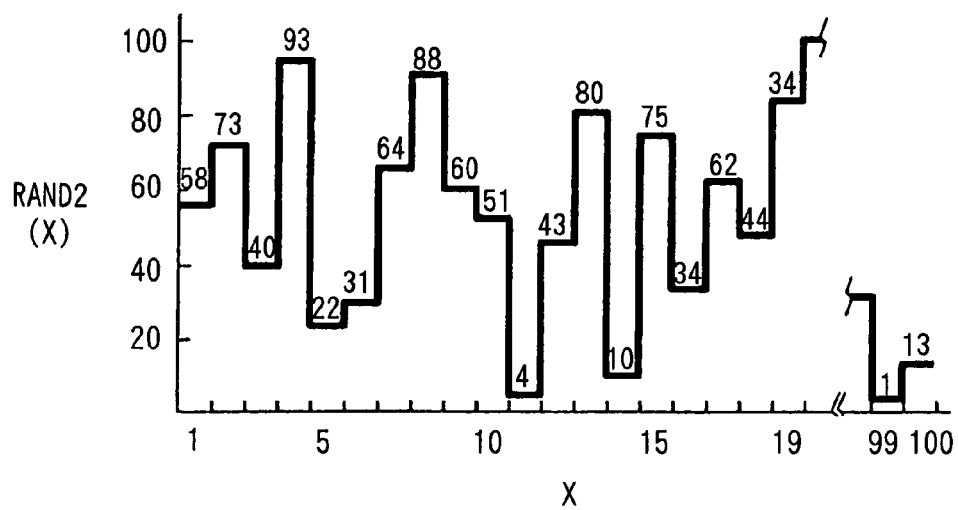
FIG. 18 is a graph of a function for computing the order of priority of temperature increase according to the present invention.

At Step 306, the temperature increase counter C2 is cleared (initialized). At Step 307, the order of priority of temperature increase E is computed by the use of a function RAND2. The function RAND2 outputs integers 1 to n at random for inputs of integers 1 to n. The order of priority of temperature increase E is computed as RAND2(C2), where C2 is subtrahend. FIG. 18 shows an example when n=100.

Next, at Step 308, the temperature increasing operation flag Flag2 is computed. Here, if the order of priority of temperature increase E is smaller than the number of temperature increases CON, the temperature increasing operation flag Flag2 is set ON, and if the order is not smaller than the number, the operation flag Flag2 is set OFF.

Figure 19:
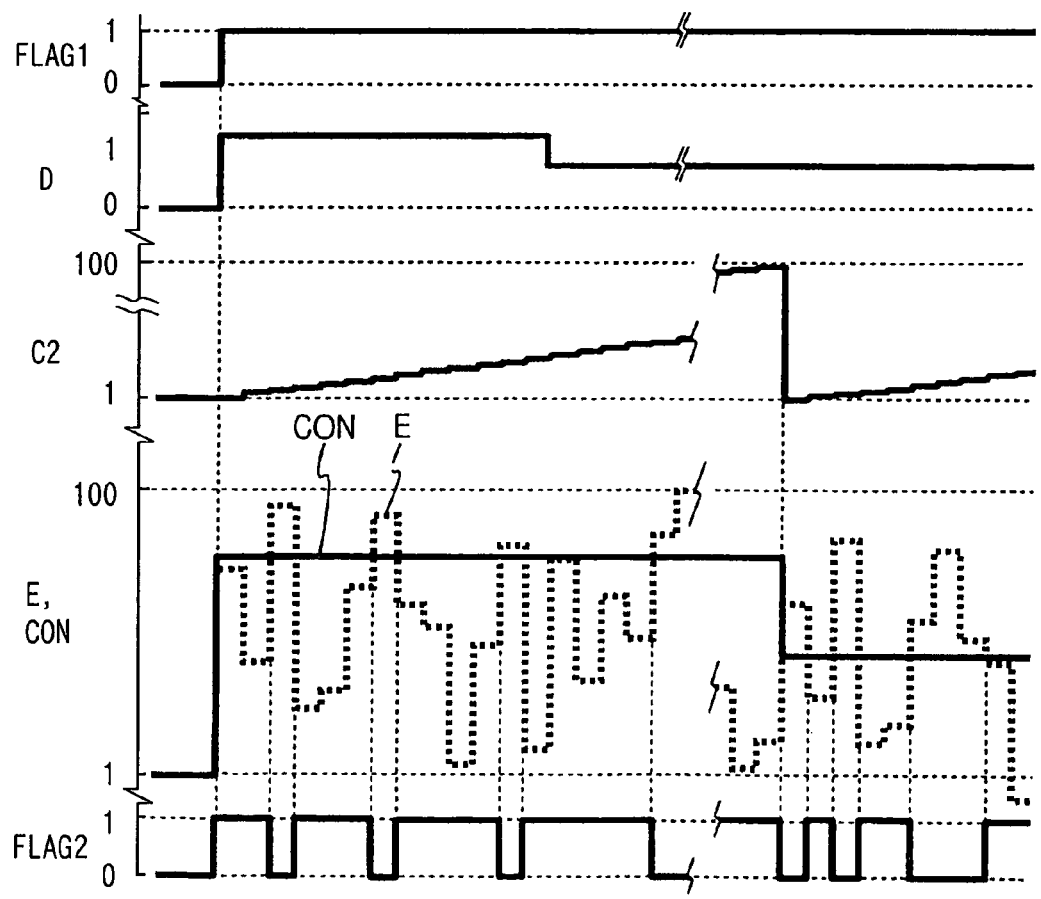
FIG. 19 is a timing chart of results of a regeneration control according to the second embodiment of the present invention.

FIG. 19 is a computation example of this embodiment. As shown in the drawing, the regeneration control is started (Flag1=ON), and the time ratio D and the base period T0 are computed according to the quantity of temperature increase Y, and a period of repeating the performance of the temperature increasing operation (Flag2=ON) and the interruption of the temperature increasing operation (Flag2=OFF) are switched at random based on the order of priority of temperature increase E within one base period T0. Therefore, this can prevent the occurrence of vibrations specific to the switching period and hence can enhance an effect of reducing torque shock.

Figure 20:
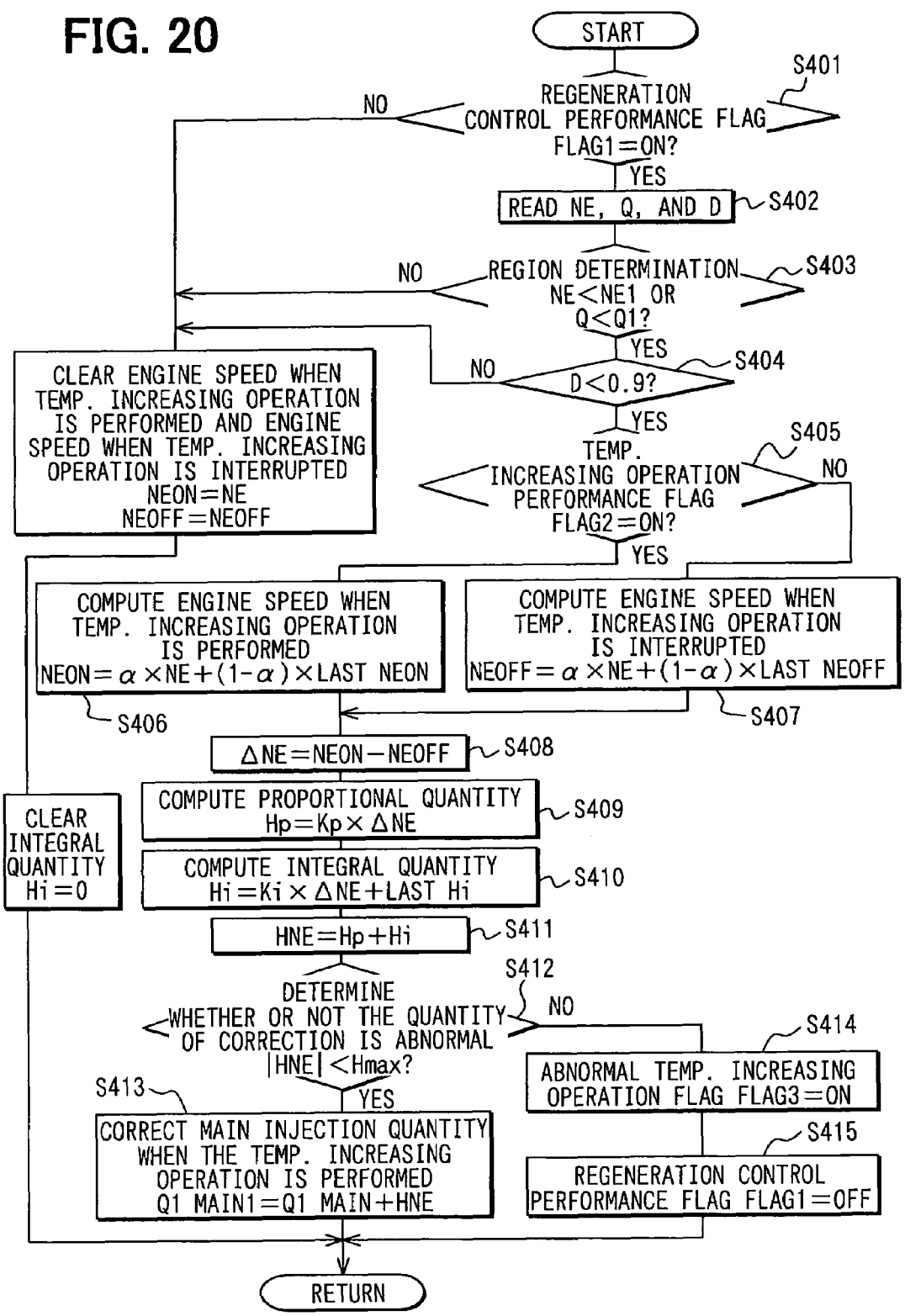
FIG. 20 is a flowchart of a regeneration control for correcting the state of combustion by the use of engine speed when a temperature increasing operation is performed and interrupted according to a third embodiment of the present invention.

FIG. 20 is a flow chart showing the third embodiment of the invention. In this embodiment, a method for correcting the state of fuel injection from a change in the engine speed caused by switching the temperature increasing operation when the regeneration control is performed will be described. In FIG. 20, first, the ECU 6 determines at Step 401 whether or not the regeneration control performance flag Flag1 is ON. If negative determination is made at Step 401, variables to be used in this flow are initialized (engine speed NEON when the temperature increasing operation is performed=NE, engine speed NEOFF when the temperature increasing operation is interrupted=NEOFF, and integral quantity Hi=0), and the processing is finished. If affirmative determination is made at Step 401, the routine proceeds to Step 402.

At Step 402, engine speed NE, injection quantity of Q (substitute for torque), and time ratio D between the performance and interruption of the temperature increasing operation are read. At subsequent Step 403, a region determination is made and if the engine speed NE is smaller than a predetermined engine speed NE1 or the injection quantity Q is smaller than a predetermined injection quantity Q1, the routine proceeds to Step 404. At Step 404, a region determination is made for the time ratio D. If the time ratio D is smaller than a predetermined value (for example, 0.9), the routine proceeds to Step 405.

At Step 405, the state of the temperature increasing operation performance flag Flag2 is checked. If the temperature increasing operation performance flag Flag2 is ON, the routine proceeds to Step 406. If the temperature increasing operation performance flag Flag2 is OFF, the routine proceeds via Step 407 to Step 408. At Step 406, the engine speed NEON when the temperature increasing operation is performed is computed. To be specific, an averaging computation is performed by the use of the following equation using the last value of the engine speed NEON when the temperature increasing operation is performed and the engine speed NE.

$$NEON = \alpha \times NE + (1-\alpha) \times \text{last } NEON$$

where α ranges from 0 to 1, for example, 0.2.

At Step 407, the engine speed NEOFF when the temperature increasing operation is stopped is computed. To be specific, an averaging computation is performed by the use of the following equation using the last value of the engine speed NEOFF when the temperature increasing operation is interrupted and the engine speed NE.

$$NEOFF = \alpha \times NE + (1-\alpha) \times \text{last } NEOFF$$

where α ranges from 0 to 1, for example, 0.2.

At Step 408, a variation ANE in the engine speed is computed from the engine speed NEON when the temperature increasing operation is performed and the engine speed NEOFF when the temperature increasing operation is interrupted. By the use of this variation ANE in the engine speed, a proportional correction term Hp is computed at Step 409 and an integral correction term Hi is computed at Step 410. Further, at Step 411, the quantity of correction HNE when the temperature increasing operation is performed is computed from the sum of the integral correction term Hi and the proportional correction term Hp.

Next, at Step 412, it is determined whether or not the quantity of correction HNE when the temperature increasing operation is performed. If the absolute value of the quantity of correction HNE when the temperature increasing operation is performed is smaller than an abnormality determination value Hmax, it is determined that the quantity of correction HNE when the temperature increasing operation is performed is not abnormal and the routine proceeds to Step 413. If the absolute value of the quantity of correction HNE when the temperature increasing operation is performed is larger than the abnormality determination value Hmax, it is determined that the quantity of correction HNE is abnormal and the routine proceeds to Step 414.

At Step 413, a main injection quantity when the temperature increasing operation is performed is corrected based on the quantity of correction HNE when the temperature increasing operation is performed. At Step 414, an abnormal temperature increasing operation flag Flag3 is set ON, and at Step 415, the regeneration control performance flag Flag1 is set OFF and the regeneration control is interrupted.

As described above, according to the invention, in the DPF temperature control during the regeneration, by preventing a period of switching between the state where fuel is injected to increase temperature and the state where fuel is normally injected (when the temperature increasing operation is interrupted) from being constant, it is possible to prevent the occurrence of vibrations specific to the period of switching, which can reduce torque shock that the driver feels. Further, by correcting the state where fuel is injected to increase temperature or the state where fuel is normally injected (when the temperature increasing operation is interrupted) according to a change in the engine speed before and after switching between the state where fuel is injected to increase temperature or the state where fuel is normally injected (when the temperature increasing operation is interrupted), it is possible to reduce torque shock.

What is claimed is:

1. A method of controlling exhaust emissions by removing particulates accumulated in a particulate filter disposed in an exhaust passage of an internal combustion engine to regenerate the particulate filter, the method comprising:

increasing a temperature of the particulate filter;
estimating the temperature of the particulate filter;
estimating a quantity of particulates accumulated in the particulate filter;
controlling a quantity of a temperature increase of the particulate filter when the quantity of accumulated particulates is estimated to exceed a predetermined value;
computing a time ratio of performance of a temperature increasing operation to a base period and a time ratio of interruption of the temperature increasing operation to the base period, the base period being a sum of a period of said performance and a period of said interruption;
computing the base period that varies from time to time and repeatedly switching between performance and the interruption of the temperature increasing operation based on the time ratios and the base period.

2. The method of claim 1, wherein the base period is computed such that the base period varies at random.

3. The method of claim 1, wherein the switching between performance and interruption of the temperature increasing operation is such that a period of performing and interrupting the temperature increasing operation is different from the base period as the time ratios are kept within the base period.

4. The method of claim 1, wherein the switching between performance and interruption of the temperature increasing operation is such that a period of performing and interrupting the temperature increasing operation is changed at random as the time ratios are kept within the base period.

5. The method of claim 1, further comprising prohibiting any one of operations of computing the time ratios, computing the base period, and switching between a performance and an interruption of the temperature increasing operation when the number of revolutions or torque of the internal combustion engine is within a predetermined limited region.

6. The method of claim 1, wherein the time ratio of the temperature increasing operation of the particulate filter to the base period remains the same even as the base period varies from time to time.

7. The method of claim 1, wherein the base period is computed such that the base period varies from time to time regardless of a specific engine condition.

8. The method of claim 7, wherein the specific engine condition is temperature.

9. The method of claim 1, wherein a state of fuel injection is corrected either when the temperature increasing operation is performed or when the temperature increasing operation is interrupted by the use of the number of revolutions of the internal combustion engine when the temperature increasing operation is performed and the number of revolutions of the internal combustion engine when the temperature increasing operation is interrupted.

10. The method of claim 9, further comprising determining that a temperature increasing operation is abnormal when the quantity of correction is larger than a predetermined value.

11. The method of claim 9, further comprising interrupting regeneration of the particulate filter when the quantity of correction is larger than a predetermined value.

12. An exhaust emission control device that burns and removes particulates accumulated in a particulate filter disposed in an exhaust passage of an internal combustion engine to regenerate the particulate filter, the device comprising:

temperature increasing means for increasing a temperature of the particulate filter;
temperature estimating means for estimating the temperature of the particulate filter;
particulate accumulation quantity estimating means for estimating a quantity of particulates accumulated in the particulate filter;
temperature increase quantity controlling means for controlling a quantity of a temperature increase by the temperature increasing means according to an output of the temperature estimating means when the quantity of accumulated particulates, which is estimated by the particulate accumulation quantity estimating means, exceeds a predetermined value;
time ratio computing means for computing a time ratio of a temperature increasing operation of the particulate filter to a base period and a time ratio of interruption of the temperature increasing operation of the particulate filter to the base period, the respective time ratios being computed based on an output of the temperature increase quantity controlling means, the base period being a sum of a period of said temperature increasing operation and a period of said interruption;
base period computing means for computing the base period such that the base period varies from time to time;
switching means for repeatedly switching between the temperature increasing operation and the interruption of the temperature increasing operation by the temperature increasing means based on the time ratios.

13. The exhaust emission control device of claim 12, wherein the base period computing means computes the base period such that the base period varies at random.

14. The exhaust emission control device of claim 12, wherein the switching means switches between the temperature increasing operation and the interruption of the temperature increasing operation such that a period of the temperature increasing operation and the interrupting the temperature increasing operation is different from the base period as the time ratios are kept within the base period.

15. The exhaust emission control device of claim 1, wherein the switching means switches between the temperature increasing operation and the interruption of the temperature increasing operation such that a period of the temperature increasing operation and the interrupting the temperature increasing operation is changed at random as the time ratios are kept within the base period.

16. The exhaust emission control device of claim 12, further comprising operation prohibiting means for prohibiting any one of operations of the time ratio computing means, the base period computing means, and the switching means when the number of revolutions or torque of the internal combustion engine is within a predetermined limited region.

17. The exhaust emission control device of claim 12, wherein the time ratio of the temperature increasing operation of the particulate filter to the base period remains the same even as the base period varies from time to time.

18. The exhaust emission control device of claim 12, wherein the base period is computed by the base period computing means such that the base period varies from time to time regardless of a specific engine condition.

19. The exhaust emission control device of claim 18, wherein the specific engine condition is temperature.

20. The exhaust emission control device of claim 12, wherein the time ratio computing means corrects a state of fuel injection either when the temperature increasing operation is performed or when the temperature increasing operation is interrupted by the use of the number of revolutions of the internal combustion engine when the temperature increasing operation is performed and the number of revolutions of the internal combustion engine when the temperature increasing operation is interrupted.

21. The exhaust emission control device of claim 20, further comprising abnormality determining means for determining that a temperature increasing operation is abnormal when the quantity of correction is larger than a predetermined value.

22. The exhaust emission control device of claim 20, further comprising regeneration interrupting means for interrupting regeneration of the particulate filter when the quantity of correction is larger than a predetermined value.

* * * * *